J. W. CRARY.
Brick Kiln.

3 Sheets—Sheet 1.

No. 20,146.

Patented May 4, 1858.

J. W. CRARY.
Brick Kiln.

3 Sheets—Sheet 2.

No. 20,146.

Patented May 4, 1858.

J. W. CRARY.
Brick Kiln.
No. 20,146.
3 Sheets—Sheet 3.
Patented May 4, 1858.
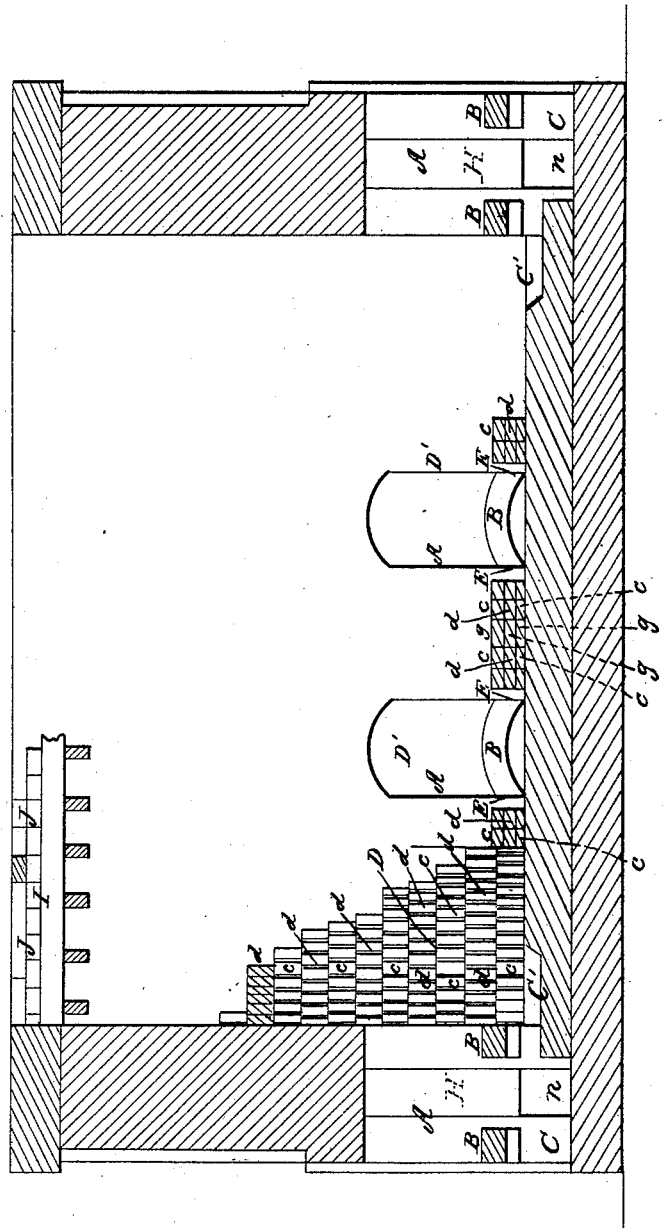

UNITED STATES PATENT OFFICE.

JNO. W. CRARY, OF NEW ORLEANS, LOUISIANA.

BRICK-KILN.

Specification of Letters Patent No. 20,146, dated May 4, 1858.

*To all whom it may concern:*

Be it known that I, JOHN W. CRARY, of the city and parish of New Orleans and State of Louisiana, have invented a new and useful Improvement in Brick-Kilns; and I do hereby declare that the following is a full, clear, and exact description of the same, reference being had to the accompanying drawings, forming a part of this specification, in which—

Figure 1:
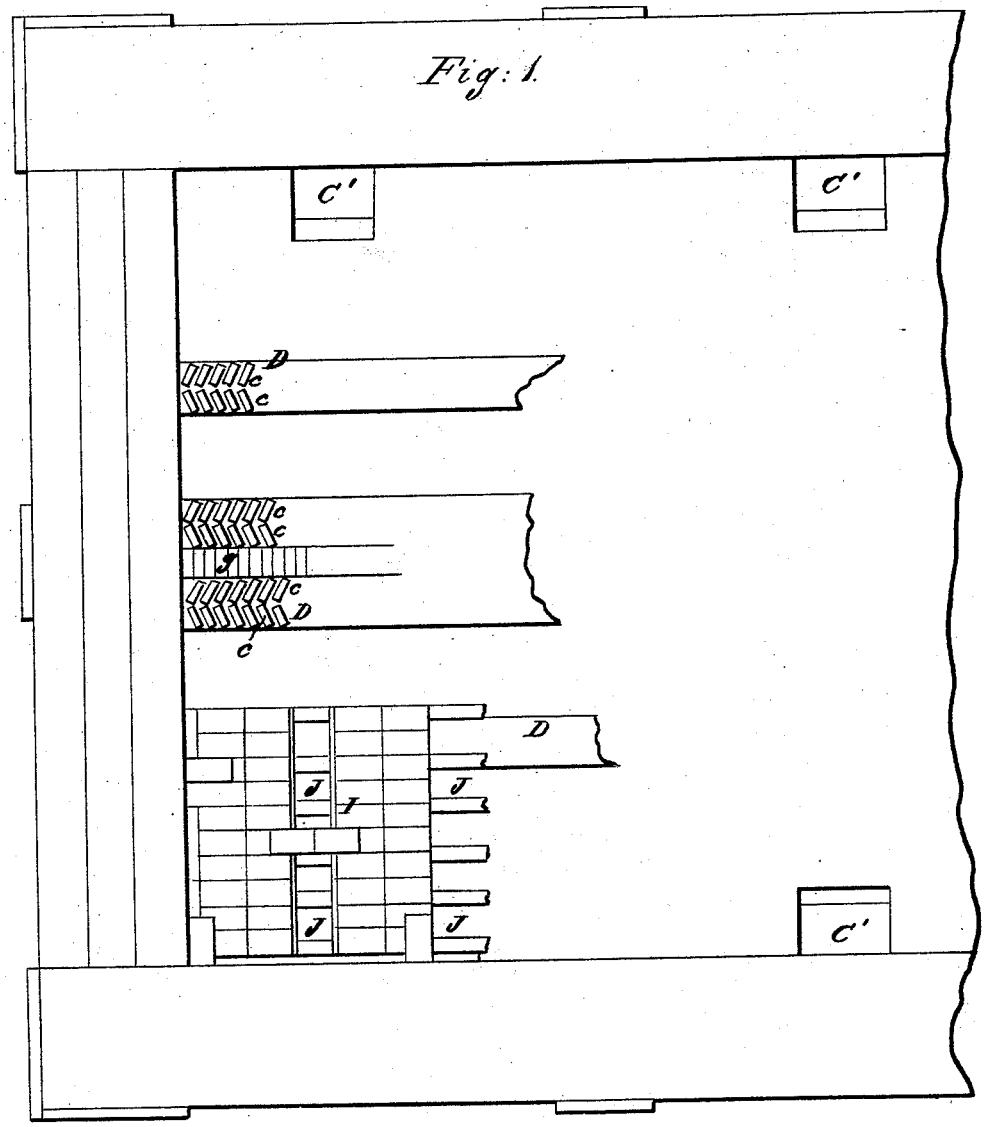
Figure 2:
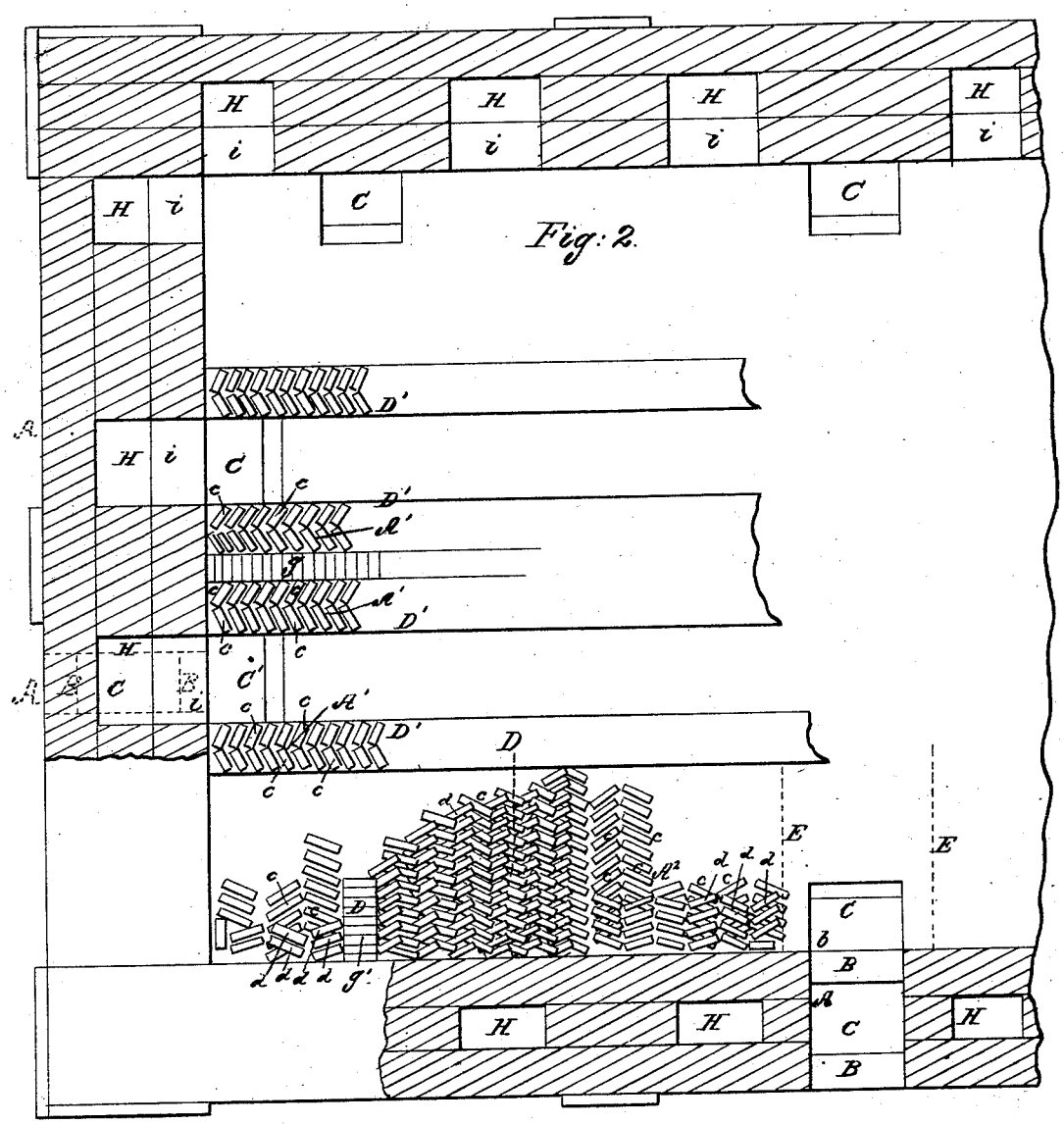

Figure 1, is a plan or top view of my improved brick kiln partially constructed. Fig. 2, is a partial horizontal section of the same, the top being removed. Fig. 3, is a vertical longitudinal section.

Similar letters of reference in each of the several figures indicate corresponding parts.

Heretofore with brick kilns many serious objections have been experienced. The most prominent among these may be mentioned 1st, the rapid destruction of the grates or furnaces. 2nd, choking up of the throats of the furnaces by the collection of charred fuel thereat. 3rd, difficulty in burning the "heads" or side walls of the kiln to the same degree, within a given time, as the body of the same. 4th, the unequal diffusion of the heat throughout the entire kiln from the side walls to the center; and a too rapid escape of the heated flame or current directly up between the bricks forming the stands and arches. 5th, want of facilities for controlling the flame or heat so as to equalize the heat at all parts of the kiln. 6th, loss of heat from the escape into the open air of the partially ignited smoke or gases emitted from the fuel of the furnaces. My invention will obviate these difficulties, if not wholly, to a very great extent.

To obviate the first of the foregoing objections, I construct the bottom of the furnaces A, with a transverse ledge or fuel support B, at their mouths *a*, and at their throats *b*, said ledges B, B, being of arch shape and formed of brick or other infusible argillaceous substance, and elevated above the air chamber or ash pit C. By this arrangement of ledges or supports, the wood is supported at each end and a free open draft space for facilitating combustion exists between the ledges, and no danger of the destruction of the supports, as when iron grates are used, by the action of intense heat is liable, as the supports are indestructible by the action of the very great heat in kilns. This is an important desideratum, as great loss ensues from the rapid destruction of metal grates; and in fact the successful working of kilns with metal grates has long ago been found impossible.

To avoid the 2nd objection I provide a secondary ash pit or air chamber C', just beyond the throat of each of the furnaces, and have the same communicating with the primary air chamber or ash pits C, of the furnaces, so that the charred cinders, etc., when forced back beyond the throat in supplying additional fuel, shall have a receptacle to fall into and there be kept alive and caused to consume by draft from the main air chamber.

To avoid the third objection, I construct the arches D, so that their inner sides shall not extend over as far as the sides of the throat of the furnaces as indicated at E, E, Fig. 2. By thus building the arches a partial vacuum is produced by the action of the draft just at the termination of the throat of each of the furnaces, and said vacuum is constantly filled by an eddy of fire formed thereat with a portion of the blaze or heated current, and thus a perfect circulation of heat or blaze about the "heads" of the kiln is constantly maintained and a good burning of the "heads" thus insured.

To avoid the 4th objection I set the brick of the arches D, and stands A', A' as follows; the bricks forming the arches being set in zigzag lines, as indicated at *c, d*. The first zig-zag tier or horizontal course being diagonal to the other zig-zag tier or course, in the manner illustrated in the drawings. The bricks of the side stands also being set in zig zag lines and every alternate zig zag tier is diagonal to the one above or below it as illustrated at *c, d*. The interstices of the zig-zag tiers of the side stands extend from arch to arch. The end stands and arches of the kiln are likewise formed by setting the bricks in zig-zag lines or tiers which stand alternately diagonal with each other, but the zig-zag interstices do not extend from arch to arch, these being closed or divided at the center of the end stands by means of a tight course of brick *g*, extending from the base to the top of the kiln for a purpose presently stated, the body of the arches at the center are also closed by a tight course of bricks. By thus setting the brick, the fire has an indirect course horizontally, and upward, and thus is caused to spread in every direction instead of being allowed to ascend straight up to the top of the kiln as is the case in the ordinary way of setting brick. My plan of setting diffuses the fire throughout the kiln while the common way of setting allows the fire to pass directly through perpendicular interstices to the top and thus the heat concentrates in the hottest places or passes off too rapidly from the cooler places and produces an uncontrollable inequality of fire in the kiln.

To obviate the 5th objection I construct the kiln with two or more auxiliary arches D', D', which extend from end to end of the kiln. The bricks of these arches are set zig-zag and alternately diagonal in the manner before described. At each end of the arches D', D' furnaces similar to those A, B, B, and C, C', are provided as shown. By this arrangement of auxiliary arches and having the same divided by the closed course g, the draft of the side furnaces and arches can be regulated and controlled in the most perfect manner. The kiln being divided longitudinally by the tight course g, and all the bricks of the kiln set so that a free circulation between them is allowed as before specified, the fire of the furnaces can be regulated as follows. If the fire is to be diverted from the middle of the kiln to the exterior, by keeping the side furnaces full of wood and the end furnaces not so full it will be accomplished, but if it is desired to concentrate or increase the heat at the center of the kiln, it will be necessary to fill up the end furnaces and not supply the side ones. Thus it will be seen that by a counteraction of draft and heat, by means of main and auxiliary furnaces, the fire and heat can be controlled and regulated at pleasure.

To obviate the 6th objection I construct the side and end walls of the kiln with a series of vertical flues H, H, which extend from the top to the base of the kiln and communicate with the air chambers C, C, of the furnaces by horizontal passages h, h, and with the interior of the kiln just below the cover or top I, by means of horizontal passages i, i, as shown. I also construct the top of the kiln partly open as shown at J, so as to facilitate the starting of the fire, the escape of moisture and the free passage of the smoke or gases to the vertical flues. It also affords facilities for a perfect closing up of the kiln after a fire has been started. By thus providing flues in the walls and having the same communicate, below the fuel supporters, with the air chambers, and closing up the top of the kiln, all the smoke or gases can be returned back to the furnaces and consumed, thus saving fuel and increasing the heat.

What I claim as my invention and desire to secure by Letters Patent, is—

1. The peculiar arrangement and manner herein described of constructing the furnaces so that, by means of the arches B, B, placed as specified and constructed of brick or other argillaceous substance, intermediate supports of grates or otherwise for the fuel, are rendered unnecessary.

2. The peculiar arrangement of auxiliary ash pits or air chambers C', with main air chambers or ash pits C, and arches D', D', formed by setting the brick zig zag and alternately diagonal, as specified, for the purpose set forth.

3. The within specified manner of constructing the brick arches D, D', when the bricks are "set" as specified, so that the horizontal area of their interior chamber shall be greater than that of the throat of the furnaces, for the purposes set forth.

4. The within specified zig-zag and alternately diagonal setting of the brick throughout the kiln for the purpose set forth.

5. The within specified arrangement and construction of auxiliary end arches and furnaces in combination with the main side arches, for the purposes set forth.

6. The within specified arrangement of vertical flues and horizontal passages in the wall in combination with the partly open top and the furnaces for the purpose set forth.

J. W. CRARY.

Witnesses:
H. H. Young,
G. Yorke At Lee.